Patented June 9, 1925.

1,541,699

UNITED STATES PATENT OFFICE.

FRANCIS ARTHUR FREETH AND LESLIE ALEXANDER MUNRO, OF HARTFORD, ENGLAND.

ALKALINE ACCUMULATOR.

No Drawing.    Application filed October 2, 1922.   Serial No. 591,921.

*To all whom it may concern:*

Be it known that we, FRANCIS ARTHUR FREETH and LESLIE ALEXANDER MUNRO, subjects of the King of Great Britain, residing at Hartford, in the county of Cheshire and Kingdom of England, have invented certain new and useful Improvements in Alkaline Accumulators, of which the following is a specification.

This invention relates to improvements in alkaline accumulators such as those of the known nickel-iron type.

Caustic potash is usually employed as the electrolyte in such batteries, although it is more expensive than caustic soda, because solutions of the latter "creep" or climb out of the vessels or containers.

According to our invention we employ solutions consisting of or containing an alkaline silicate as electrolyte. We prefer to use a solution of sodium silicate in which the ratio of ($SiO_2$) silica to soda is low i. e. less than 2 of silica to 1 of soda, whereas commercial water glass often contains up to 4 parts of silica to 1 part of soda. But we may even use mixtures of sodium silicate and caustic soda.

Potassium silicate may also be used alone or in admixture with caustic potash or soda or sodium silicate.

It is important to use a solution as pure as possible since certain impurities such as chlorides should be excluded from the electrolyte. Hence we may prepare a specially pure silicate solution by carefully excluding such impurities from the raw materials from which the solution is made.

Sodium silicate solution has the advantage of possessing a high viscosity and the solution does not "creep" so that we are thus enabled to replace the expensive caustic potash solution by a much cheaper liquid.

In acid accumulators, it has been proposed to add sodium silicate to the electrolyte which then precipitated the silica as a jelly but our invention is limited to alkaline batteries, in which no such precipitation is desired or takes place.

Our electrolyte consists essentially of a soluble silicate as distinct from a gelatinous precipitate of silica. As stated, we prefer to use liquid electrolytes consisting of commercial sodium silicate solutions.

We declare that what we claim is:—

In a battery, the combination of electrodes of nickel and iron with an alkaline solution of sodium silicate containing a large excess of soda.

In witness whereof, we have hereunto signed our names this 19th day of Sept. 1922, in the presence of two subscribing witnesses.

FRANCIS ARTHUR FREETH.
LESLIE ALEXANDER MUNRO.

Witnesses:
   H. GREGORY,
   J. MCLACHLAN.